US012450965B2

(12) United States Patent
Xiao et al.

(10) Patent No.: US 12,450,965 B2
(45) Date of Patent: Oct. 21, 2025

(54) SMART DOOR LOCK SYSTEMS AND METHODS FOR MANAGING ACCESS CONTROL OF THE SAME

(71) Applicant: Consumer 2.0 Inc., Los Angeles, CA (US)

(72) Inventors: Rui Zhu Xiao, Shenzhen (CN); Clark Zhe Li, Los Angeles, CA (US); Qi Jie Pu, Shenzhen (CN)

(73) Assignee: Consumer 2.0 Inc., Los Angeles, CA (US)

( * ) Notice: Subject to any disclaimer, the term of this patent is extended or adjusted under 35 U.S.C. 154(b) by 117 days.

(21) Appl. No.: 18/412,607

(22) Filed: Jan. 15, 2024

(65) Prior Publication Data

US 2025/0232627 A1 Jul. 17, 2025

(51) Int. Cl.
*G07C 9/00* (2020.01)

(52) U.S. Cl.
CPC ..... *G07C 9/00857* (2013.01); *G07C 9/00309* (2013.01)

(58) Field of Classification Search
CPC ........................ G07C 9/00857; G07C 9/00309
See application file for complete search history.

(56) References Cited

U.S. PATENT DOCUMENTS

| | | | | |
|---|---|---|---|---|
| 7,475,812 | B1 * | 1/2009 | Novozhenets | G07C 9/21 235/382 |
| 8,985,443 | B1 * | 3/2015 | Boyle | G07C 9/00857 235/382 |
| 9,589,400 | B2 | 3/2017 | Radicella et al. | |
| 11,823,512 | B1 * | 11/2023 | Nguyen | G07C 9/00571 |
| 2015/0206365 | A1 | 7/2015 | Wu | |
| 2015/0235497 | A1 * | 8/2015 | Voss | G07C 9/00309 340/5.61 |
| 2023/0075252 | A1 * | 3/2023 | Du | G07C 9/00571 |

FOREIGN PATENT DOCUMENTS

| | | |
|---|---|---|
| CN | 114360100 A | 4/2022 |
| CN | 112634493 B | 7/2022 |

* cited by examiner

*Primary Examiner* — Nabil H Syed
(74) *Attorney, Agent, or Firm* — EAGLE IP LIMITED

(57) ABSTRACT

One example embodiment is a method for managing access control of a smart door lock system, including the steps of: generating a random key as a second card identifier for an access card having a first card identifier, wherein the first and second card identifiers form a card data set; pushing the card data set to a cloud server and storing the card data set in a database; assigning the access card to a smart door lock having a door lock identifier; pushing the first card identifier and the door lock identifier to the cloud server; pushing the card data set to the smart door lock; and storing the card data set as an assigned password set, such that the access card has authorization to control the locking/unlocking of the smart door lock. Other example embodiments are described herein. In certain embodiments, the system is simple and convenient to operate.

18 Claims, 3 Drawing Sheets

SMART DOOR LOCK SYSTEMS AND METHODS FOR MANAGING ACCESS CONTROL OF THE SAME

FIELD OF INVENTION

This invention relates to door lock systems, in particular smart door lock systems, and methods for managing access control of the same.

BACKGROUND OF INVENTION

Conventional methods for managing access control of electronic door locks generally require a series of complex operations. For example, adding an access card to a door lock usually requires operation performed on the door lock, which increases the working difficulty and management costs to add or delete access cards in batch. In addition, some of the commercially available smart door locks use the same key for multiple locks and access cards, which increases the risk of security. There is an urgent need for improved smart door lock systems and methods of managing access control of the same.

SUMMARY OF INVENTION

In the light of the foregoing background, in certain embodiments, it is an object to provide an improved smart door lock system and method for managing access control of the same to solve the problems of security and complexity of operation of existing electronic door locks.

Accordingly, in one aspect, provided is a method for managing access control of a smart door lock system, including the steps of: (a) generating a random key as a second card identifier for an access card having an associated first card identifier, wherein the first card identifier and the second card identifier form a card data set; (b) storing the card data set in the access card; (c) pushing the card data set to a cloud server; (d) storing in a database, by the cloud server, the card data set associated with the access card; (e) reading or receiving input, by one or more client terminals, the first card identifier associated with the access card; (f) assigning, by the one or more client terminals, the access card to a smart door lock having an associated door lock identifier; (g) pushing, by the one or more client terminals, the first card identifier and the door lock identifier to the cloud server; (h) determining, by the cloud server, whether the first card identifier matches with any one of stored first card identifiers of stored card data sets in the database; (i) if matches, pushing, by the cloud server, the card data set associated with the access card directly or indirectly to the corresponding smart door lock based on the door lock identifier; and (j) storing, by the corresponding smart door lock, the card data set as an assigned password set, such that the access card has authorization to control the locking and/or unlocking of the smart door lock.

In another aspect, provided is a smart door lock system, including: one or more access cards, each configured to store an associated card data set including an associated first card identifier and an associated second card identifier; a random key generating module, configured to generate a new random key as a second card identifier for a new access card having an associated first card identifier; and to store the second card identifier to the new access card to form a new card data set with the first card identifier; one or more smart door locks, each including: an electronic lock; a door lock memory, configured to store at least one assigned password set; an access card reader, configured to read the associated card data set of any access card; and a processor, configured to verify the associated card data set from any access card against the assigned password set, and if verified, send an authorization signal to the electronic lock to operatively control a locking state and an unlocking state of the electronic lock; one or more client terminals, each configured to read or receive an input of an associated first card identifier from an access card, assign the access card to a smart door lock having an associated door lock identifier, and push the first card identifier and the door lock identifier to a cloud server; and the cloud server, configured to store one or more door lock identifiers and one or more card data sets in a database and is configured to be in electronic communication with the one or more client terminals and optionally the one or more smart door locks; wherein the cloud server is further configured to determine whether the first card identifier matches with any one of stored first card identifiers of stored card data sets in the database, and if matches, push the corresponding card data set directly or indirectly to the door lock memory of the smart door lock with which the corresponding door lock identifier being associated and store the card data set as an assigned password set.

Other example embodiments are discussed herein.

There are various advantages of the present disclosure. For instance, some embodiments provide novel smart door lock systems that are simple and convenient to operate. Some embodiments provide novel methods for managing access control of the smart door lock systems which enable the users, such as management personnels of a rental community or a rental apartment, to conveniently add or delete an access card for any smart door lock of the community or apartment without the need to personally visit the smart door lock to perform the aforesaid operations.

In some embodiments, each access card of the smart door lock system is written and stored with a first card identifier and a random key generated as a second card identifier when the access cards are manufactured and shipped out of the factory, and the first card identifier and second card identifier of each access card are uploaded and stored in a cloud server database, which significantly improves the security because the random key generated as a second card identifier for each access card is unique.

In some embodiments, the smart door locks and/or the one or more client terminals are in electronic communication with the cloud server via internet connection, such as by wireless means, e.g., Wi-Fi, Z-Wave, Zigbee, Thread, and/or Bluetooth. As such, when adding an access card to a smart door lock, an administrator only needs to use the administrator's client terminal to scan the machine-readable code (such as barcode or QR code) on the access card by using a code scanner or a camera on the administrator's client terminal to obtain the first card identifier of the access card, assign the access card to a smart door lock having an associated door lock identifier, and push the first card identifier and the door lock identifier to the cloud server. The cloud server sends the corresponding card data set of the access card to the corresponding smart door lock to perform the addition of the access card to the smart door lock remotely. Similarly, access card deletion or modification operations can be performed remotely.

In some embodiments, when said smart access card is in use, the smart door lock reads the card data set from the access card and uses said card data set to verify the access card and perform an unlocking operation, which is both convenient and secure.

DETAILED DESCRIPTION OF THE PREFERRED EMBODIMENTS

Figure 1:
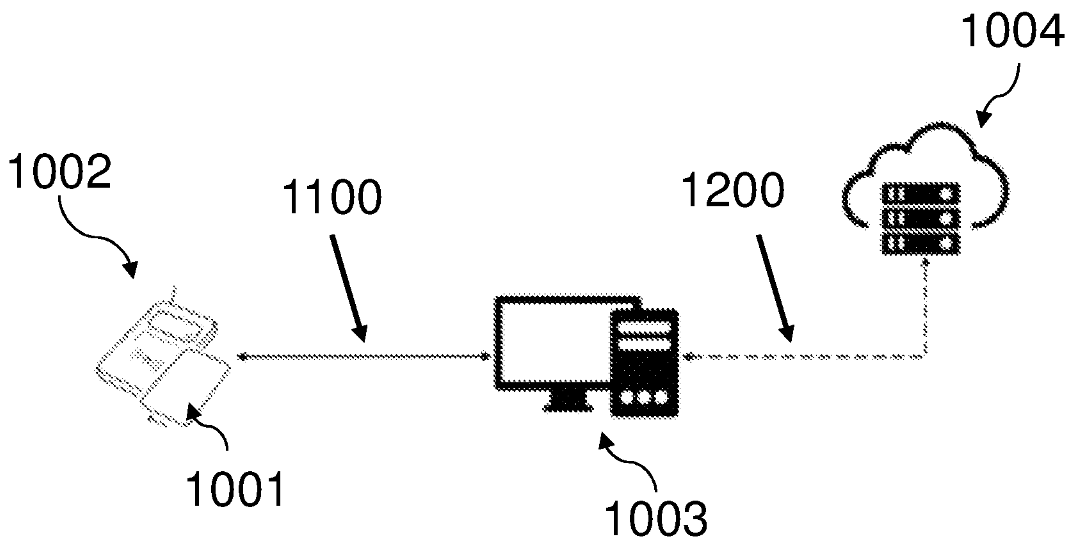
FIG. 1 shows the operation of generating and storing a random key for a new access card according to an example embodiment.

As used herein and in the claims, "comprising" means including the following elements but not excluding others.

As used herein and in the claims, "couple" or "connect" refers to electrical coupling or connection either directly or indirectly via one or more electrical means unless otherwise stated.

As used herein and in the claims, "electronic communication" refers to the communication between two or more devices, components or elements via one or more electronic means to transmit information such as signals, data, instructions, and/or commands. In some embodiments, electronic communication is established through one or more wired or wireless networks, for example, a cloud network, internet, an intranet, an extranet, a cellular network, a local area network (LAN), a home area network (HAN), metropolitan area network (MAN), a wide area network (WAN), a wireless network such as Wi-Fi network, Z-Wave network, Zigbee network, Thread network and Bluetooth network, public and private networks, etc.

As used herein and in the claims, "access card" refers to a physical or virtual medium which is configured to store or contain one or more card identity information such as card identifiers and/or other additional information, and configured to be readable by any device, component or element. In some embodiments, an access card is a physical card. In some embodiments, an access card can be a virtual card stored in a device, such as a mobile device.

As used herein and in the claims, "smart door lock" refers to a door lock system that includes an electronic lock and one or more means for access control. In some embodiments, the means for access control may include one or more electronic access control components, access cards or devices that are operably connected with the electronic lock to control a locking state and an unlocking state of the electronic lock. In some embodiments, smart door lock contains a door lock memory, a processor, an electronic lock, and an access card reader.

As used herein and in the claims, "card identifier" refers to a set of unique information that is associated with an access card to represent the identity of the access card. In some embodiments, a card identifier is a unique serial number, machine-readable code, or a unique random key that is associated with the access card. In some embodiments, an access card contains one or more card identifiers stored in the access card.

As used herein and in the claims, "random key" refers to a set of random data generated as a card identifier specific for a given access card.

As used herein and in the claims, when a card data set is pushed "directly or indirectly", for example from a first device to a second device, it means that the card data set is either pushed from the first device to the second device directly via a direct electronic communication therebetween, or indirectly by first pushing the card data set from the first device to a third device via an electronic communication therebetween, and then pushing the card data set from the third device to the second device via an electronic communication therebetween.

As used herein and in the claims, when an access card is "assigned" to a smart door lock, it means that the access card is given the authorization to control the locking and/or unlocking of the smart door lock.

In some embodiments, provided is a method for managing access control of a smart door lock system, including the steps of: (a) generating a random key as a second card identifier for an access card having an associated first card identifier, wherein the first card identifier and the second card identifier form a card data set; (b) storing the card data set in the access card; (c) pushing the card data set to a cloud server; (d) storing in a database, by the cloud server, the card data set associated with the access card; (e) reading or receiving input, by one or more client terminals, the first card identifier associated with the access card; (f) assigning, by the one or more client terminals, the access card to a smart door lock having an associated door lock identifier; (g) pushing, by the one or more client terminals, the first card identifier and the door lock identifier to the cloud server; (h) determining, by the cloud server, whether the first card identifier matches with any one of stored first card identifiers of stored card data sets in the database; (i) if matches, pushing, by the cloud server, the card data set associated with the access card directly or indirectly to the corresponding smart door lock based on the door lock identifier; and (j) storing, by the corresponding smart door lock, the card data set as an assigned password set, such that the access card has authorization to control the locking and/or unlocking of the smart door lock.

In some embodiments, the method further includes the step of: pre-registering the door lock identifier and the card data set and pushing the door lock identifier and the card data set to the cloud server to be stored in the database.

In some embodiments, each smart door lock further includes an access card reader configured to read the card data set from the access card.

In some embodiments, the method further includes the steps of: reading, by the access card reader, the card data set from the access card; verifying, by the smart door lock, the card data set against the assigned password set; and if verified, changing the smart door lock into unlocking state.

In some embodiments, step (i) further includes the steps of: pushing, by the cloud server, the corresponding card data set to the one or more client terminals as a corresponding client data set; and wirelessly connecting the one or more client terminals with the smart door lock; and pushing, by the one or more client terminals, the corresponding client data set to a smart door lock and storing the corresponding client data set as an assigned password set.

In some embodiments, the method further includes the steps of: sending, by one or more client terminals to the cloud server, a removal signal to remove a card data set of an access card from an assigned password set of a corresponding smart door lock; pushing, by the cloud server, the card data set and the removal signal directly or indirectly to the corresponding smart door lock; and removing, by the smart door lock, the card data set from the assigned password set.

In some embodiments, the method further includes the steps of: sending, by one or more client terminals to the corresponding smart door lock, a first card identifier of an access card and a removal signal to remove a card data set of the access card from an assigned password set of a corresponding smart door lock; removing, by the smart door lock, the card data set from the assigned password set; and sending, by the one or more client terminals to the cloud server, the first card identifier of the access card and the removal signal to record the removal in the cloud server.

In some embodiments, the one or more client terminals are selected from a group consisting of a mobile device and a computing device.

In some embodiments the one or more client terminals and optionally the smart door lock are in electronic communication with the cloud server via wireless means.

In some embodiments, the wireless means is selected from a group consisting of Wi-Fi, Z-Wave, Zigbee, Thread and Bluetooth.

In some embodiments, the access card includes a card memory configured to store the associated card data set.

In some embodiments, the method further includes the step of: reading, by the one or more client terminals, a machine-readable code on the access card to obtain the first card identifier associated with the access card.

In some embodiments, provided is a smart door lock system, including: one or more access cards, each configured to store an associated card data set including an associated first card identifier and an associated second card identifier; a random key generating module, configured to generate a new random key as a second card identifier for a new access card having an associated first card identifier; and to store the second card identifier to the new access card to form a new card data set with the first card identifier; one or more smart door locks, each including: an electronic lock; a door lock memory, configured to store at least one assigned password set; an access card reader, configured to read the associated card data set of any access card; and a processor, configured to verify the associated card data set from any access card against the assigned password set, and if verified, send an authorization signal to the electronic lock to operatively control a locking state and an unlocking state of the electronic lock; one or more client terminals, each configured to read or receive an input of an associated first card identifier from an access card, assign the access card to a smart door lock having an associated door lock identifier, and push the first card identifier and the door lock identifier to a cloud server; and the cloud server, configured to store one or more door lock identifiers and one or more card data sets in a database and is configured to be in electronic communication with the one or more client terminals and optionally the one or more smart door locks; wherein the cloud server is further configured to determine whether the first card identifier matches with any one of stored first card identifiers of stored card data sets in the database, and if matches, push the corresponding card data set directly or indirectly to the door lock memory of the smart door lock with which the corresponding door lock identifier being associated and store the card data set as an assigned password set.

In some embodiments, the system further includes a pre-registering module configured to pre-register the door lock identifiers and the card data sets and to push the door lock identifiers and the card data sets to the cloud server.

In some embodiments, the cloud server is configured to indirectly pushing the corresponding card data set to the smart door lock via one or more client terminals that are wirelessly connecting with the smart door lock, so as to store the corresponding client data set as an assigned password set in the smart door lock.

In some embodiments, the client terminal is selected from a group consisting of a mobile device and a computing device.

In some embodiments, the electronic communication is wireless communication selected from a group consisting of Wi-Fi, Z-Wave, Zigbee, Thread and Bluetooth.

In some embodiments, each access card includes a card memory configured to store an associated card data set.

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Example 1

Referring now to FIG. 1, which shows the operation of generating and storing a random key for an access card according to an example embodiment. A unused access card 1001, when manufactured and shipped out of the factory, contains certain card identification information including a first card identifier (e.g. a unique serial number) that is associated with the access card 1001. In this example, the first card identifier is a machine-readable code (such as barcode or QR code) that is displayed or printed on the access card 1001. A client terminal 1003, such as a manufacturer's computer or an administrator's computer, is installed with a random key generating module and is configured to be in electronic communication with a cloud server 1004. In this example, the electronic communication is in wireless communication.

In step 1100, a smart card reader 1102 electronically connected with the client terminal 1003 reads the machine-readable code of the access card 1001 to obtain the first card identifier of the new access card 1001, and send the first card identifier to the client terminal 1003. The random key generating module in client terminal 1003 generates a unique random key as a second card identifier specific for the access card 1001. The random key is unique to the new access card 1001 and in other words, it will not be used for any other access cards. The client terminal 1003 then writes and stores the second card identifier to the access card 1001 (such as via the smart card reader). The first card identifier and the second card identifier together form a card data set for the specific access card 1001.

In step 1200, the client terminal 1003 pushes the card data set containing the first card identifier and the corresponding second card identifier of the access card 1001 to the cloud server 1004 via wireless communication. The cloud server 1004 stores the new card data set associated with the access card 1001 as one of the stored card data sets in a database of the cloud server 1004, thereby completing the registration of the access card 1001 in the cloud server database.

Example 2

Figure 2:
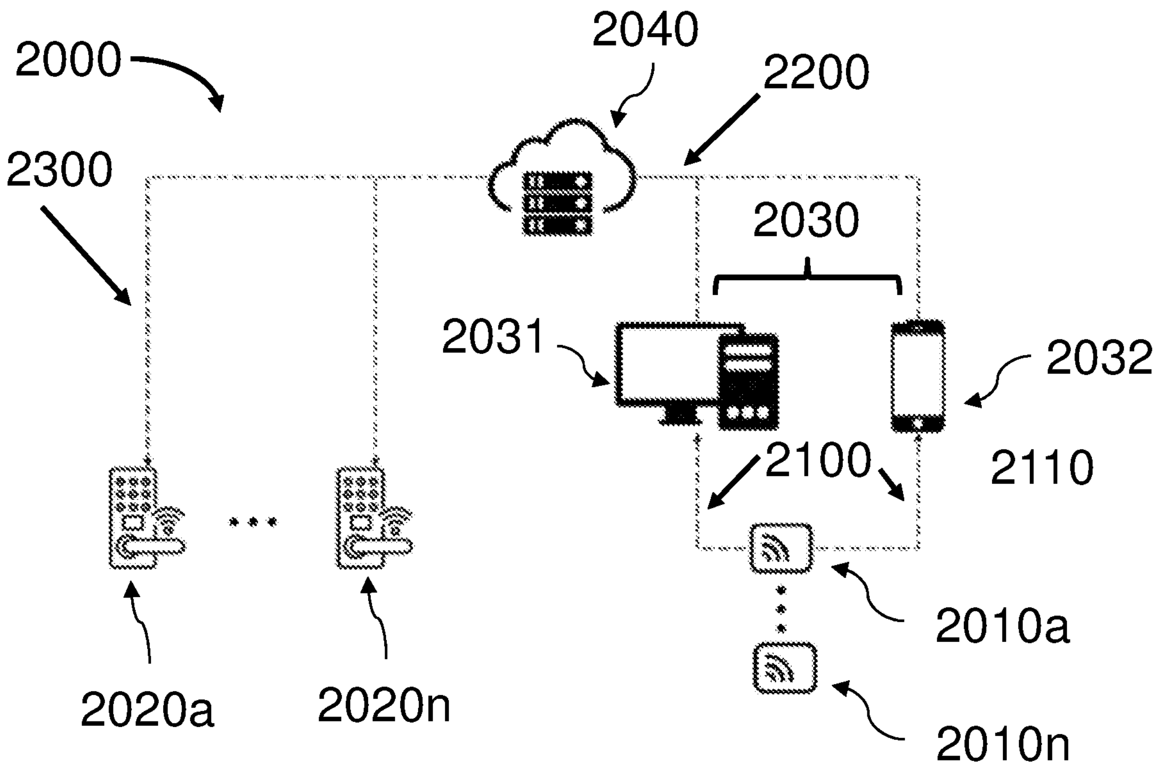
FIG. 2 is schematic diagram of an example smart door lock system according to an example embodiment.

FIG. 2 shows an example smart door lock system 2000 according to an example embodiment. In this embodiment, the smart door lock system 2000 includes a plurality of access cards 2010*a* to 2010*n*, a plurality of smart door locks

2020*a* to 2020*n*, two client terminals 2030, and a cloud server 2040. In this embodiment, the cloud server 2040 is in electronic communication with the client terminals 2030 and the smart door locks 2020*a* to 2020*n* via internet connection such as by wireless means (e.g., Wi-Fi, Z-Wave, Zigbee, Thread, Bluetooth, etc.).

In this embodiment, each of the access cards 2010*a* to 2010*n* is configured to store an associated card data set including an associated first card identifier and an associated second card identifier. In some embodiments, the second card identifier of each access card 2010*a* to 2010*n* is pre-generated by a random key generating module (not shown in FIG. 2) and stored in the access card with a process similar to that as described in Example 1. In some embodiments, each access card 2010*a* to 2010*n* includes a card memory configured to store the associated card data set.

Each of the smart door locks 2020*a* to 2020*n* includes an electronic lock, a door lock memory configured to store at least one assigned password set, an access card reader configured to read the associated card data set of any one of the access cards 2010*a* to 2010*n*, and a processor. The processor is configured to verify the associated card data set from any one of the access cards 2010*a* to 2010*n* against the assigned password set stored in the door lock memory, and send an authorization signal to the electronic lock to operatively control a locking state and an unlocking state of the electronic lock based on the verification results. Details of the operation of the smart door locks will be described later. In some embodiments, each of the smart door locks 2020*a* to 2020*n* is associated with a door lock identifier. In some embodiments, all the door lock identifiers of all smart door locks 2020*a* to 2020*n* are stored in a database of the cloud server 2040. In some embodiments, the smart door locks 2020*a* to 2020*n* are integrated with one or more access control devices for access control.

In this embodiment as shown in FIG. 2, the client terminals 2030 include a computing device 2031 and a mobile device 2032. Each of the client terminals 2030 is configured to read or receive an input of an associated first card identifier from any one of the access cards 2010*a* to 2010*n*. In some embodiments, each of the client terminals 2030 includes a code scanner or a camera electronically connected with the client terminal to scan a machine-readable code (such as barcode or QR code) on the access card, such that the first card identifier of the access card can be obtained. Each of the client terminals 2030 is also configured to assign one access card to one of the smart door locks 2020*a* to 2020*n* having an associated door lock identifier, and push the first card identifier and the door lock identifier to the cloud server 2040. In some embodiments, the client terminals 2030 are accessible only by an authorized administrator (such as a management personnel of a rental community or a rental apartment) that have the authority to assign or remove an access card to one or more of the smart door locks 2020*a* to 2020*n*. In some embodiments, each of the client terminal 2030 include a client terminal processor configured to execute a user interface application (for example, a mobile application (APP) for the mobile device 2032) to perform some or all of the operations described above. In some embodiments, one or more of the client terminals 2030 further include a pre-registering module configured to pre-register the door lock identifiers of the smart door locks 2020*a* to 2020*n* and the card data sets of the access cards 2010*a* to 2010*n* and to push the door lock identifiers and the card data sets to the cloud server 2040. This allows the smart door lock system to add/remove multiple access cards to/from the corresponding smart door locks in batch.

Still referring to FIG. 2, the cloud server 2040 is configured to store one or more door lock identifiers of the smart door locks 2020*a* to 2020*n* and one or more card data sets of the access cards 2010*a* to 2010*n* in a database. The cloud server 2040 further includes a cloud server processor configured to determine whether the first card identifier of a given access card matches with any one of stored first card identifiers of stored card data sets in the database. If matches, the cloud server 2040 is configured to push the corresponding card data set directly or indirectly to the door lock memory of the smart door lock with which the corresponding door lock identifier being associated and store the card data set as an assigned password set.

Adding One or More Access Cards to a Smart Door Lock

Now turning to the operation of the smart door lock system 2000 to add one or more access cards 2010*a* to 2010*n* to a smart door lock 2020*a* according to an example embodiment by referring to FIG. 2. In step 2100, the first card identifier associated with each of the access cards 2010*a* to 2010*n* is read or inputted by the one or more client terminals 2030, i.e., the computing device 2031 and/or the mobile device 2032. A user (such as an authorized administrator) can then assign one or more access cards 2010*a* to 2010*n* to one designated smart door lock (in this example, 2020*a*) having an associated door lock identifier by using the one or more client terminals 2030. In some embodiments, the one or more client terminals 2030 are installed with a user interface application (such as a mobile application) for the management of the operation of the smart door lock system 2000, so that the user can choose any available smart door lock(s) 2020*a* to 2020*n* in the smart door lock system 2000 stored in the cloud server 2040 to pair with any access card(s) 2010*a* to 2010*n*. In step 2200, the one or more client terminals 2030 push the respective first card identifier(s) of the one or more assigned access cards 2010*a* to 2010*n* and the door lock identifier of the smart door lock 2020*a* to the cloud server 2040. The cloud server 2040 determines if the first card identifier(s) matches with any one of stored first card identifiers of stored card data sets in the database. In step 2300, if the first card identifier(s) matches with any one of stored first card identifiers in the database, the cloud server 2040 pushes the respective card data set(s) associated with the one or more assigned access cards 2010*a* to 2010*n* directly to the corresponding smart door lock 2020*a* based on the door lock identifier. The corresponding smart door lock 2020*a* stores the card data set(s) of the one or more assigned access card(s) 2010*a* to 2010*n* sent by the cloud server 2040 to the door lock memory as assigned password set(s), such that the one or more assigned access card(s) 2010*a* to 2010*n* have authorization to control the locking and/or unlocking of the smart door lock 2020*a*. The addition of one or more of the access card(s) 2010*a* to 2010*n* to the smart door lock 2020*a* is thus completed.

Removing One or More Access Cards from a Smart Door Lock

Now turning to the operation of the smart door lock system 2000 to remove one or more access cards 2010*a* to 2010*n* from a smart door lock 2020*a* according to an example embodiment. When a user intends to remove one or more access cards 2010*a* to 2010*n* from the smart door lock 2020*a*, the user can access the client terminal 2030 (for example, via a user interface application installed in the computing device 2031 or mobile device 2032) to select the corresponding smart door lock 2020*a*, select the one or more access cards 2010*a* to 2010*n* to be removed and select the removal operation in the user interface application. The client terminal 2030 then sends a removal signal to the cloud server 2040 to remove the card data set(s) of the one or more access cards 2010*a* to 2010*n* from the assigned password set(s) stored in the smart door lock 2020*a* and to update the database. The cloud server 2040 pushes the card data set(s) of the one or more access cards 2010*a* to 2010*n* and the removal signal to the corresponding smart door lock 2020*a*, and the smart door lock 2020*a* removes or disassociates the card data set(s) of the one or more access cards 2010*a* to 2010*n* from the assigned password set(s) in response to the removal signal. The smart door lock 2020*a* then is available for adding another access card(s). The removal of the one or more access cards 2010*a* to 2010*n* from the smart door lock 2020*a* is thus completed, and the one or more originally assigned access cards 2010*a* to 2010*n* will no longer have authorization to control the locking and/or unlocking of the smart door lock 2020*a*.

Example 3

Figure 3:
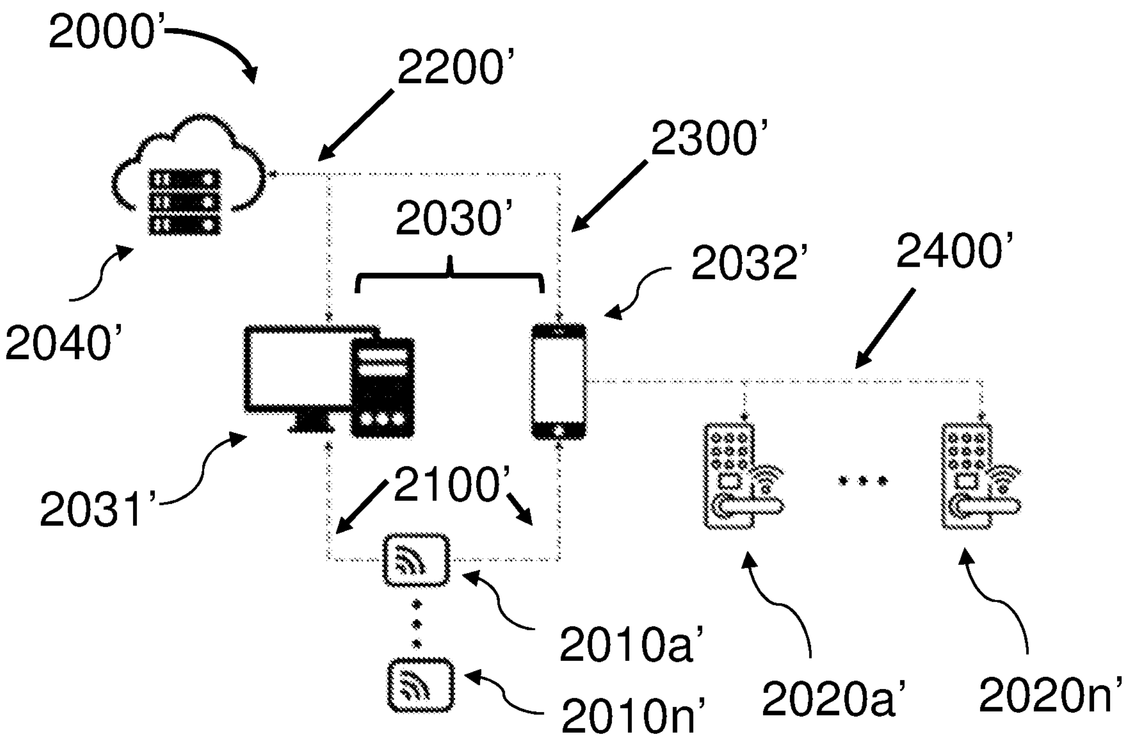
FIG. 3 is schematic diagram of an example smart door lock system according to another example embodiment.

Referring now to FIG. 3, which shows another example embodiment a smart door lock system 2000'. Similar to Example 2, the smart door lock system 2000' includes a plurality of access cards 2010*a'* to 2010*n'*, a plurality of smart door locks 2020*a'* to 2020*n'*, two client terminals 2030', and a cloud server 2040'. The client terminals 2030' includes a computing device 2031' and a mobile device 2032'. In this embodiment, the cloud server 2040' is still electronically (wirelessly) connected with the client terminals 2030', but the smart door lock 2020*a'* is offline, i.e., not electronically (wirelessly) connected with the cloud server.

Adding One or More Access Cards to a Smart Door Lock

Now turning to the operation of the smart door lock system 2000' to add one or more access cards 2010*a'* to 2010*n'* to a smart door lock 2020*a'* according to an example embodiment by referring to FIG. 3. In step 2100', the first card identifier associated with each of the one or more access cards 2010*a'* to 2010*n'* is read or inputted by the one or more client terminals 2030', i.e., the computing device 2031' and/or the mobile device 2032'. A user can then assign one or more access cards 2010*a'* to 2010*n'* to the smart door lock 2020*a'* having an associated door lock identifier by using the one or more client terminals 2030'. In step 2200', the one or more client terminals 2030' push the respective first card identifier(s) of the one or more assigned access cards 2010*a'* to 2010*n'* and the door lock identifier of the smart door lock 2020*a'* to the cloud server 2040'. The cloud server 2040' determines if the first card identifier(s) matches with any one of stored first card identifiers of stored card data sets in the database. In step 2300', if the first card identifier(s) matches with any one of stored first card identifiers in the database, the cloud server 2040' pushes the respective card data set(s) associated with the one or more assigned access cards 2010*a'* to 2010*n'* to one or more of the client terminals 2030' (in this example, to the mobile device 2032') as a corresponding client data set(s). In some embodiments, the client data set(s) can be temporarily stored in the mobile device 2032'. In step 2400', the mobile device 2032' is wirelessly connected (for example, via a Bluetooth connection) to the corresponding smart door lock 2020*a'*. Once the wireless connection is established, the mobile device 2032' pushes the corresponding client data set(s) to the smart door lock 2020*a'*. The smart door lock 2020*a'* stores the client data set(s) of the one or more assigned access cards 2010*a'* to 2010*n'* sent by the mobile device 2032' to the door lock memory as assigned password set(s), such that the one or more assigned access cards 2010*a'* to 2010*n'* has authorization to control the locking and/or unlocking of the smart door lock 2020*a'*. The addition of the one or more access cards 2010*a'* to 2010*n'* to the smart door lock 2020*a'* is thus completed even when the smart door locks are not wirelessly connected with the server.

Removing One or More Access Cards from a Smart Door Lock

Now turning to the operation of the smart door lock system 2000' to remove one or more access cards 2010*a'* to 2010*n'* from a smart door lock 2020*a'* according to an example embodiment. In this embodiment, the smart door lock 2020*a'* is offline, i.e. not wirelessly connected to the cloud server. In such situation, when a user intends to remove one or more access cards 2010*a'* to 2010*n'* from the smart door lock 2020*a'*, the user can access the client terminal 2030' (for example, via a user interface application installed in the computing device 2031' or mobile device 2032') to select the corresponding smart door lock 2020*a'*, select the one or more access cards 2010*a'* to 2010*n'* to be removed and select the removal operation in the user interface application. The client terminal 2030' then sends the respective first card identifier(s) of the one or more access cards 2010*a'* to 2010*n'* and a removal signal directly to the corresponding smart door lock 2020*a'* via wireless connection (e.g., Bluetooth connection) to remove the respective card data set(s) of the one or more access cards 2010*a'* to 2010*n'* from the assigned password set(s) stored in the smart door lock 2020*a'*. If the removal is successfully performed by the smart door lock 2020*a'*, the client terminal 2030' sends the respective first card identifier(s) of the one or more access cards 2010*a'* to 2010*n'* and the removal signal to the cloud server 2040' to record the removal information in the cloud server. The removal of the one or more access cards 2010*a'* to 2010*n'* from the smart door lock 2020*a'* is thus completed, and the one or more access cards 2010*a'* to 2010*n'* will no longer have authorization to control the locking and/or unlocking of the smart door lock 2020*a'*.

Example 4

Figure 4:
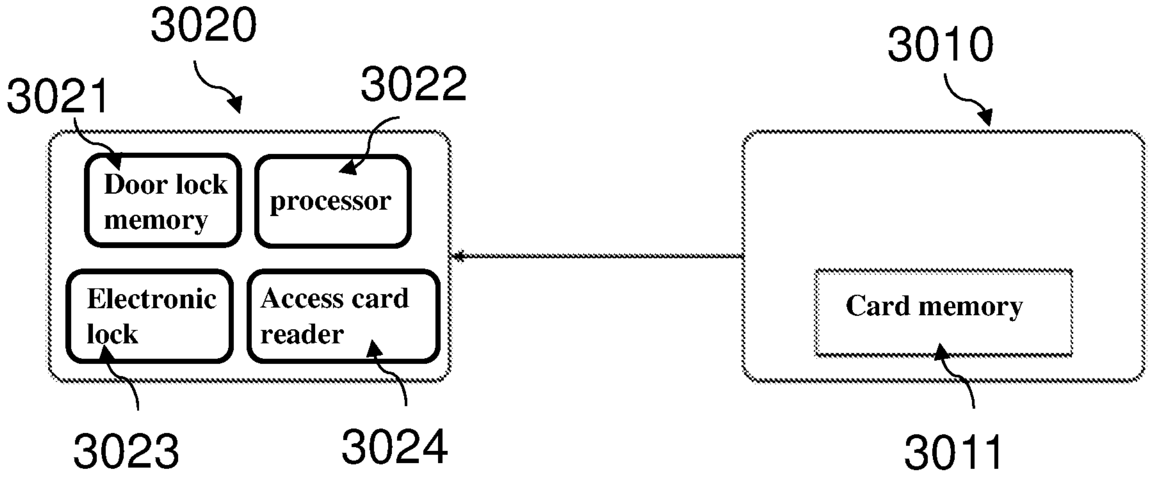
FIG. 4 shows the verification process of an access card by a smart door lock according to an example embodiment.

Now referring to FIG. 4, showing the operation of a smart door lock 3020 in verifying an access card 3010 according to an example embodiment. The access card 3010 includes a card memory 3011, configured to store an associated card data set including an associated first card identifier and an associated second card identifier. The second card identifier of the access card 3010 is generated by a random key generating module and stored in the card memory with a process similar to that as described in Example 1. The smart door lock 3020 includes a door lock memory 3021, a processor 3022, an electronic lock 3023, and an access card reader 3024. The door lock memory 3021 is configured to store at least one assigned password set that is received from either the cloud server (by a process similar to that as described in Example 2) or the one or more client terminals (by a process similar to that as described in Example 3).

When the access card 3010 is in use (i.e. making a request to the smart door lock 3020 to unlock the smart door lock), the access card reader 3024 of the smart door lock 3020 first reads the associated card data set stored in the card memory 3011 of the access card 3010 and sends the associated card data set to the processor 3022. The processor 3022 carries out a verification process for the associated card data set, i.e. determining whether the associated card data set (both the first card identifier and the second card identifier) matches with any one of the assigned password sets stored in the smart door lock 3020. If the associated card data set is verified, the processor 3020 sends an authorization signal to the electronic lock 3023 to change the electronic lock into unlocking state. However, if the verification fails, then the access card 3010 is considered as an unauthorized card, and the smart door lock 3020 will not carry out the operation of unlocking the electronic lock. As both the first card identifier and second card identifier of the access card has to be verified against the corresponding first card identifier and second card identifier of the assigned password set, the security of the smart door lock is significantly improved because the random key generated as an additional (second) card identifier for the card data set of each authorized access card (that is stored as assigned password set) is unique.

Example 5

Method for Managing Access Control of a Smart Door Lock System

Figure 5:
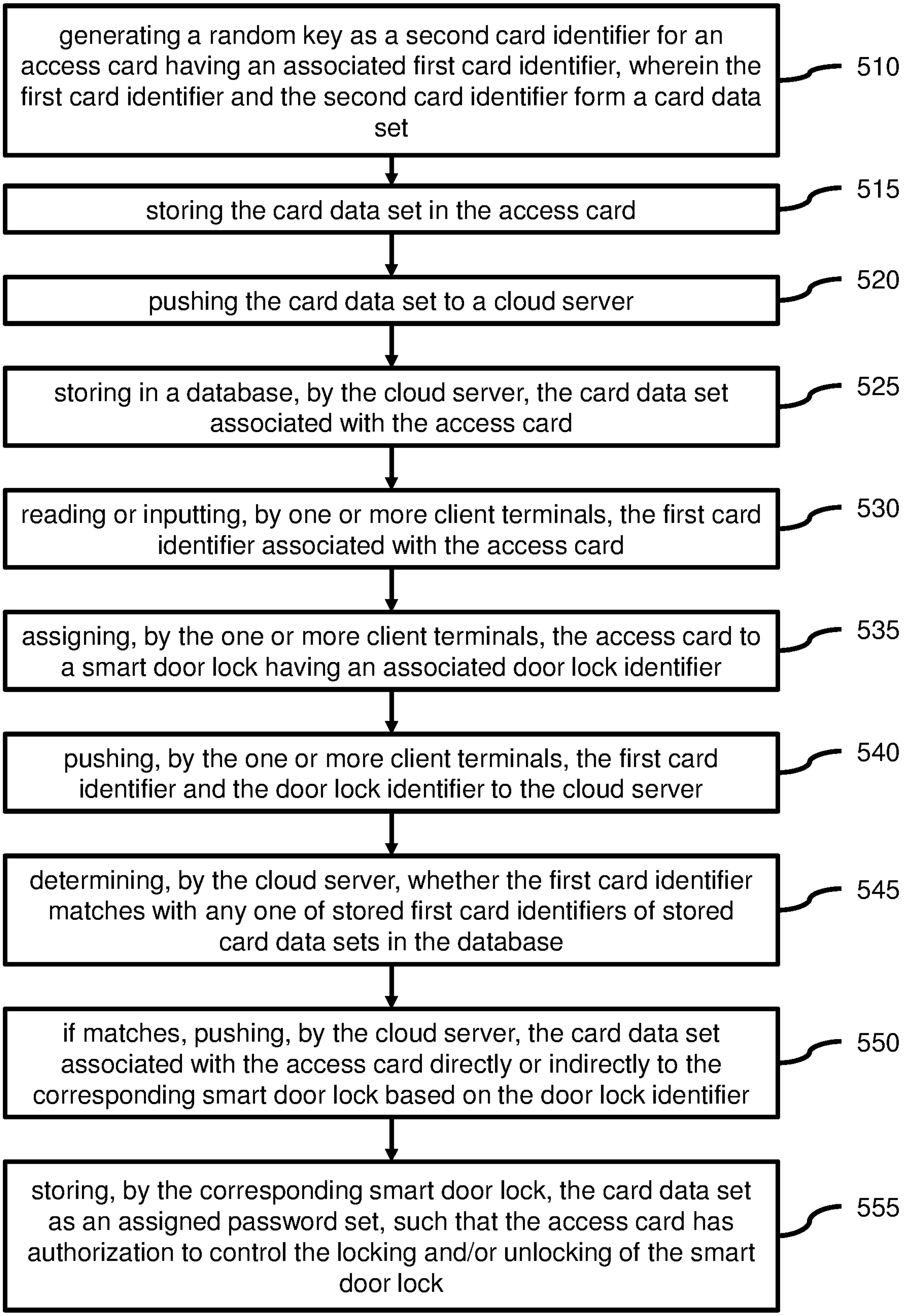
FIG. 5 shows an example method for managing access control of a smart door lock system according to an example embodiment.

Now referring to FIG. 5, which shows an example of a method for managing access control of a smart door lock system with the following steps involved:

(a) Step 510: generating a random key as a second card identifier for an access card having an associated first card identifier, wherein the first card identifier and the second card identifier form a card data set;
(b) Step 515: storing the card data set in the access card;
(c) Step 520: pushing the card data set to a cloud server;
(d) Step 525: storing in a database, by the cloud server, the card data set associated with the access card;
(e) Step 530: reading or receiving input, by one or more client terminals, the first card identifier associated with the access card;
(f) Step 535: assigning, by the one or more client terminals, the access card to a smart door lock having an associated door lock identifier.
(g) Step 540: pushing, by the one or more client terminals, the first card identifier and the door lock identifier to the cloud server;
(h) Step 545: determining, by the cloud server, whether the first card identifier matches with any one of stored first card identifiers of stored card data sets in the database;
(i) Step 550: if matches, pushing, by the cloud server, the card data set associated with the access card directly or indirectly to the corresponding smart door lock based on the door lock identifier; and
(j) Step 555: storing, by the corresponding smart door lock, the card data set as an assigned password set, such that the access card has authorization to control the locking and/or unlocking of the smart door lock.

The system and method of the present disclosure may be implemented in the form of a software application running on one or more computer systems. Further, portions of the methods may be executed on one such computer system, while the other portions are executed on one or more other such computer systems. Examples of the computer system include a mainframe, personal computer, handheld computer, server, etc. The software application may be stored on a recording media locally accessible by the computer system and accessible via a hard wired or wireless connection to a network, for example, a local area network, or the Internet.

The computer system may include, for example, a processor, random access memory (RAM), a printer interface, a display unit, a local area network (LAN) data transmission controller, a LAN interface, a network controller, an internal bus, and one or more input devices, for example, a keyboard, mouse etc. The computer system can be connected to a data storage device.

In some embodiments, the different components of the smart door lock systems may be connected together through one or more networks. The networks can include one or more of the cloud network, internet, an intranet, an extranet, a cellular network, a local area network (LAN), a home area network (HAN), metropolitan area network (MAN), a wide area network (WAN), a wireless network such as Wi-Fi network, Z-Wave network, Zigbee network, Thread network and Bluetooth network, public and private networks, etc.

The processor can be a central processing unit (CPU), microprocessor, microcontrollers, digital signal processor (DSP), field programmable gate arrays (FPGA), application-specific integrated circuits (ASIC), etc., for controlling the overall operation of memory (such as random access memory (RAM) for temporary data storage, read only memory (ROM) for permanent data storage, and firmware). One or more processors can communicate with each other and memory and perform operations and tasks that implement one or more blocks of the flow diagrams discussed herein.

The memory, for example, stores applications, data, programs, algorithms (including software to implement or assist in implementing example embodiments) and other data. Memory can include dynamic or static random-access memory (DRAM or SRAM) or read-only memory such as Erasable and Programmable Read-Only Memories (EPROMs), Electrically Erasable and Programmable Read-Only Memories (EEPROMs) and flash memories, as well as other memory technologies, singly or jointly combined. The memory, for example, stores applications, data, programs, algorithms (including software to implement or assist in implementing example embodiments) and other data.

The storage typically includes persistence storage such as magnetic disks such as fixed and removable disks; other magnetic media including tape; optical media such as Compact Disks (CDs) or Digital Versatile Disks (DVDs), and semiconductor storage devices such as flash memory cards, solid-state drive, EPROMs, EEPROMS or other storage technologies, singly or in combination. Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

It should be understood for those skilled in the art that the division between hardware and software is a conceptual division for ease of understanding and is somewhat arbitrary. Moreover, it will be appreciated that peripheral devices in one computer installation may be integrated to the host computer in another. Furthermore, the application software systems may be executed in a distributed computing environment. The software program and its related databases can be stored in a separate file server or database server and is transferred to the local host for execution. Those skilled in the art will appreciate that alternative embodiments can be adopted to implement the present invention.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the smart card reader 1102 as described in Example 1 above can be a QR code scanner, a barcode scanner, or a camera.

For example, in some embodiments, a single access card can be assigned to a single smart door lock in the smart door lock system. In some embodiments, a single access card can be assigned to two or more smart door locks in the smart door lock system. In some embodiments, two or more access cards can be assigned to a single smart door lock in the smart door lock system.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A method for managing access control of a smart door lock system, comprising the steps of:

a. generating a random key as a second card identifier for an access card having an associated first card identifier, wherein the first card identifier and the second card identifier form a card data set;

b. storing the card data set in the access card;

c. pushing the card data set to a cloud server;

d. storing in a database, by the cloud server, the card data set associated with the access card;

e. reading or receiving input, by one or more client terminals, the first card identifier associated with the access card;

f. assigning, by the one or more client terminals, the access card to a smart door lock having an associated door lock identifier;

g. pushing, by the one or more client terminals, the first card identifier and the door lock identifier to the cloud server;

h. determining, by the cloud server, whether the first card identifier matches with any one of stored first card identifiers of stored card data sets in the database;

i. if matches, pushing, by the cloud server, the card data set associated with the access card directly or indirectly to the corresponding smart door lock based on the door lock identifier; and j. storing, by the corresponding smart door lock, the card data set as an assigned password set, such that the access card has authorization to control the locking and/or unlocking of the smart door lock.

2. The method of claim 1, further comprising the step of:

pre-registering the door lock identifier and the card data set and pushing the door lock identifier and the card data set to the cloud server to be stored in the database.

3. The method of claim 1, wherein each smart door lock further comprises an access card reader configured to read the card data set from the access card.

4. The method of claim 3, further comprising the steps of:

reading, by the access card reader, the card data set from the access card;

verifying, by the smart door lock, the card data set against the assigned password set; and if verified, changing the smart door lock into unlocking state.

5. The method of claim 1, wherein step (i) further comprises the steps of:

pushing, by the cloud server, the corresponding card data set to the one or more client terminals as a corresponding client data set; and wirelessly connecting the one or more client terminals with the smart door lock; and pushing, by the one or more client terminals, the corresponding client data set to a smart door lock and storing the corresponding client data set as an assigned password set.

6. The method of claim 1, further comprising the steps of:

sending, by one or more client terminals to the cloud server, a removal signal to remove a card data set of an access card from an assigned password set of a corresponding smart door lock;

pushing, by the cloud server, the card data set and the removal signal directly or indirectly to the corresponding smart door lock; and removing, by the smart door lock, the card data set from the assigned password set.

7. The method of claim 1, further comprising the steps of:

sending, by one or more client terminals to the corresponding smart door lock, a first card identifier of an access card and a removal signal to remove a card data set of the access card from an assigned password set of a corresponding smart door lock;

removing, by the smart door lock, the card data set from the assigned password set; and sending, by the one or more client terminals to the cloud server, the first card identifier of the access card and the removal signal to record the removal in the cloud server.

8. The method of claim 1, wherein the one or more client terminals are selected from a group consisting of a mobile device and a computing device.

9. The method of claim 1, wherein the one or more client terminals and the smart door lock are in electronic communication with the cloud server via wireless means.

10. The method of claim 9, wherein the wireless means is selected from a group consisting of Wi-Fi, Z-Wave, Zigbee, Thread and Bluetooth.

11. The method of claim 1, wherein the access card comprises a card memory configured to store the associated card data set.

12. The method of claim 1, further comprising the step of:

reading, by the one or more client terminals, a machine-readable code on the access card to obtain the first card identifier associated with the access card.

13. A smart door lock system, comprising:

one or more access cards, each configured to store an associated card data set comprising an associated first card identifier and an associated second card identifier;

a random key generating module, configured to generate a new random key as a second card identifier for a new access card having an associated first card identifier; and to store the second card identifier to the new access card to form a new card data set with the first card identifier;

one or more smart door locks, each comprising:

an electronic lock;

a door lock memory, configured to store at least one assigned password set;

an access card reader, configured to read the associated card data set of any access card; and a processor, configured to verify the associated card data set from any access card against the assigned password set, and if verified, send an authorization signal to the electronic lock to operatively control a locking state and an unlocking state of the electronic lock;

one or more client terminals, each configured to read or receive an input of an associated first card identifier from an access card, assign the access card to a smart door lock having an associated door lock identifier, and push the first card identifier and the door lock identifier to a cloud server; and the cloud server, configured to store one or more door lock identifiers and one or more card data sets in a database and is configured to be in electronic communication with the one or more client terminals and the one or more smart door locks;

wherein the cloud server is further configured to determine whether the first card identifier matches with any one of stored first card identifiers of stored card data sets in the database, and if matches, push the corresponding card data set directly or indirectly to the door lock memory of the smart door lock with which the corresponding door lock identifier being associated and store the card data set as an assigned password set.

14. The system of claim 13, further comprising a pre-registering module configured to pre-register the door lock identifiers and the card data sets and to push the door lock identifiers and the card data sets to the cloud server.

15. The system of claim 13, wherein the cloud server is configured to indirectly pushing the corresponding card data set to the smart door lock via one or more client terminals that are wirelessly connecting with the smart door lock, so as to store the corresponding client data set as an assigned password set in the smart door lock.

16. The system of claim 13, wherein the client terminal is selected from a group consisting of a mobile device and a computing device.

17. The system of claim 13, wherein the electronic communication is wireless communication selected from a group consisting of Wi-Fi, Z-Wave, Zigbee, Thread and Bluetooth.

18. The system of claim 13, wherein each access card comprises a card memory configured to store an associated card data set.

* * * * *